United States Patent [19]

Stein

[11] Patent Number: 5,436,716
[45] Date of Patent: Jul. 25, 1995

[54] APPARATUS FOR OPTICALLY TESTING OBJECTS SUCH AS SECURITY DOCUMENTS OR LABELS

[75] Inventor: Dieter Stein, Holzkirchen, Germany

[73] Assignee: GAO Gesellschaft für Automation und Organisation mbH, Germany

[21] Appl. No.: 934,670

[22] PCT Filed: May 21, 1992

[86] PCT No.: PCT/EP92/01141

§ 371 Date: Mar. 24, 1993

§ 102(e) Date: Mar. 24, 1993

[87] PCT Pub. No.: WO92/21099

PCT Pub. Date: Nov. 26, 1992

[30] Foreign Application Priority Data

May 24, 1991 [DE] Germany ............... 41 17 011.3

[51] Int. Cl.⁶ .................. G02B 6/10; G02B 6/122
[52] U.S. Cl. .................. 356/71; 250/227.2
[58] Field of Search ............ 356/401, 71; 250/227.2, 250/368, 553

[56] References Cited

U.S. PATENT DOCUMENTS

| | | |
|---|---|---|
| 3,187,627 | 6/1965 | Kapany . |
| 3,665,191 | 5/1972 | Moody ............... 250/368 |
| 4,107,534 | 8/1978 | Piltingsrud ............ 250/368 |
| 4,303,855 | 12/1981 | Bapst et al. ............ 250/226 |
| 4,323,778 | 4/1982 | Wykes et al. ............ 250/368 |
| 5,122,653 | 6/1992 | Ohki ............... 250/227.2 |

FOREIGN PATENT DOCUMENTS 0012818 7/1980 European Pat. Off. .
0240277 10/1987 European Pat. Off. .

OTHER PUBLICATIONS

*Optical Engineering*, Jan./Feb. 1981, vol. 20, No. 1, p. 95, Bert Y. Wong: "Optical System with Fiber Optical Elements".

*Proceedings of the Society of Photo-optical Instrumentation Engineers*, vol. 31, pp. 13–22, 1972, S. E. Glazer: "Taper Measurement Techniques".

Primary Examiner—Robert P. Limanek
Assistant Examiner—Alexander Oscar Williams
Attorney, Agent, or Firm—Bacon & Thomas

[57] ABSTRACT

The invention relates to an optical sensor system, in particular for detecting diffuse low-intensity radiation as occurs in testing bank notes provided with luminescent features. In a preferred embodiment the sensor system comprises a flared optical fiber pipe and a processing optical system, whereby the narrow cross-sectional end of the fiber pipe can be used to detect the radiation from the test object at a large solid angle. Due to the change in cross section this radiation emerges from the fiber pipe at a much smaller angle that is coordinated with the aperture angle of the succeeding optical system.

18 Claims, 5 Drawing Sheets

APPARATUS FOR OPTICALLY TESTING OBJECTS SUCH AS SECURITY DOCUMENTS OR LABELS

BACKGROUND OF THE INVENTION

1. Field of the Invention

The present invention relates to an apparatus for optically testing objects such as security documents or labels with an optical system that detects the radiation from the test object and feeds it to a processing unit.

2. Description of Related Art

To detect diffusely scattering objects of low light intensity, for example fluorescent layers or bank notes with luminescent features, one uses optical lens systems that detect the light emitted by the object at a solid angle as great as possible.

In the special case of detecting luminescence, which is known to occur in a narrow defined spectral range, one uses special aspherical optical systems that permit the use of narrow-band interference filters and focus the filtered luminescent radiation on a succeeding detector.

These optical systems ideally have an aperture ratio, i.e. a lens diameter/focal length ratio D:f, of 1:1 to 2:1, whereby an aperture ratio of 1:1 or 2:1 means that a solid angle $\Theta=53°$ or $\Theta=90°$ is detected. This is because one half the solid angle $\Theta/2$ is connected with the aperture ratio, which is also frequently called the f-number, by the trigonometric relation $(D/f)=2\tan(\Theta/2)$.

However the ideal aperture angle $\Theta/2$ of 45° is almost impossible to realize in practice. The actually used aspherical lenses have a maximum aperture angle of 30° to 40° and an aperture ratio of about 1.7:1, which corresponds for example to a lens with a diameter of 22 mm and a focal length of 13 mm.

In the case of confined space relations, as are fundamentally found for example in the vicinity of the test object in bank note testers, such lens assemblies can therefore not be used without a compromise between aperture ratio and lens size. This is because a simultaneous reduction of focal length and lens diameter at a constant aperture ratio is usually subject to apparatus-related limits, in particular when thick lenses of short focal length are used to obtain a compact structure.

In the special case of bank note testers the lenses can often not be brought closer than about 10 mm to the test object so that the focal length of the entrance lens is defined. Also, the space relations are so confined particularly in bank note testers that even a reduction of the focal length to 8 mm and the resulting reduction of the lens diameter to about 13.5 mm (at a maximum aperture angle of 40°) would not suffice. Therefore either smaller lenses are used, which reduces the f-number of the system, or, if a plurality of identical test systems are disposed side by side, the number of measuring systems is reduced to create room for larger single systems.

The f-number problem, i.e. the problem of detecting a maximum solid angle in the area of the test object with the optical system requiring little space, can be solved by using optical fibers. Optical fibers are known to have a large numerical aperture so that they detect a large part of the radiated intensity even at a small diameter.

A number of different fiber assemblies have already become known that are used as radiation receivers. Thus DE-A 25 59 430 describes a sensor apparatus consisting of two fiber bundles, with infrared radiation being guided via one fiber bundle onto the document to be tested which contains luminescent markings based on rare earths. Via the second fiber bundle the visible light emitted by the feature substance is fed to a photodiode.

Another embodiment is disclosed in EP-A 0 240 277. Here a fiber bundle consisting of a multiplicity of single fibers is fanned on the side facing the test object in accordance with the area to be scanned, while at the opposite end it is bunched into a small light-emitting surface and passes the transmitted radiation on to a detector.

EP-C 0 051 460 discloses a further variant that likewise has an end flared in accordance with the test object and a bunched end. However in this case it is a light-guiding sheet having a strip-like light entrance surface and a small circular exit surface followed directly by a photo-multiplier.

All these fiber assemblies have the disadvantage that the gain in f-number is lost again when an optical system is disposed therebehind. This is because with a straight optical fiber the angle of incidence corresponds to the angle of reflection. That is, if the fiber has an aperture angle of 70° and the following optical system, as already stated, has a maximum aperture angle of 30° to 40° the radiation that emerges from the fiber at a greater angle than 40° is lost for the signal evaluation.

This problem is even more serious when interference filters are used. The transmission curve of the interference filter shifts at greater angles of incidence due to changed path differences to shorter wavelengths. The maximum tolerable angle of incidence is about 20° for a conventional interference filter. Therefore a lens system must fundamentally be disposed between the light guide and the interference filter to ensure a largely parallel beam path. As already stated, however, the adaptation between the lens system and the light guide is not optimal.

SUMMARY OF THE INVENTION

The objectives of the invention is therefore to provide an optical sensor system, in particular for detecting diffusely luminous objects of low light intensity, that can be used without a loss of measuring signal in confined space relations and also permits the use of processing optical components with a small aperture angle.

The essence of the invention is to use a specially formed non-imaging optical system whose entrance surface facing the test object has a large numerical aperture. The special design of the optical system causes light incident for example at the maximum angle of entry to leave the optical system at a much smaller angle. The geometrical ratios of the optical system are selected such that the smaller angle of emergence corresponds to the maximum numerical aperture of a processing unit. In this way the f-number obtained by the large numerical aperture on the test object side is not lost.

In a preferred embodiment the optical system is a flared light pipe whose narrow end serves as an entrance surface while the flared exit surface faces the processing optical system. The conical shape results in a change of the aperture angle in accordance with the formula $\sin\alpha=(D/d)\sin\beta$, where $\alpha$ is the angle of incidence on the side of the smaller cross section d and $\beta$ is the angle of emergence on the side of the greater cross section D.

The change in cross section and the resulting change in numerical aperture makes it possible to adjust the angle of emergence of the fiber pipe so that it corresponds to the maximum aperture angle of a succeeding optical system. For example a light beam emerges from the light pipe at $\Theta=32°$ when it has entered at $\Theta=60°$ and the pipe undergoes a change in cross section from 7.5 mm to 12 mm.

The coupling of the inventive optical fiber pipe having an optimized change in cross section with an optical imaging system thus creates a total optical system characterized by a much greater f-number and thus signal intensity.

In a further embodiment the optical system likewise comprises a flared light guide with a concave entrance surface, whereby the boundary of the concave surface preferably corresponds to a spherical sector. Here too the diameter of the entrance surface is smaller than that of the exit surface.

The special form of the entrance surface has the advantage that reflection losses occurring at this place can be minimized if the test object is located in the plane of the center of the sphere. This is because the radiation from the center of the sphere falls on the entrance surface at right angles and is thus neither reflected nor refracted.

Further advantages and developments of the invention are explained in more detail in the figures and companying description. For the sake of clarity the representation in the figures is not true to scale or to proportion.

DETAILED DESCRIPTION OF THE PREFERRED EMBODIMENTS

Figure 1:
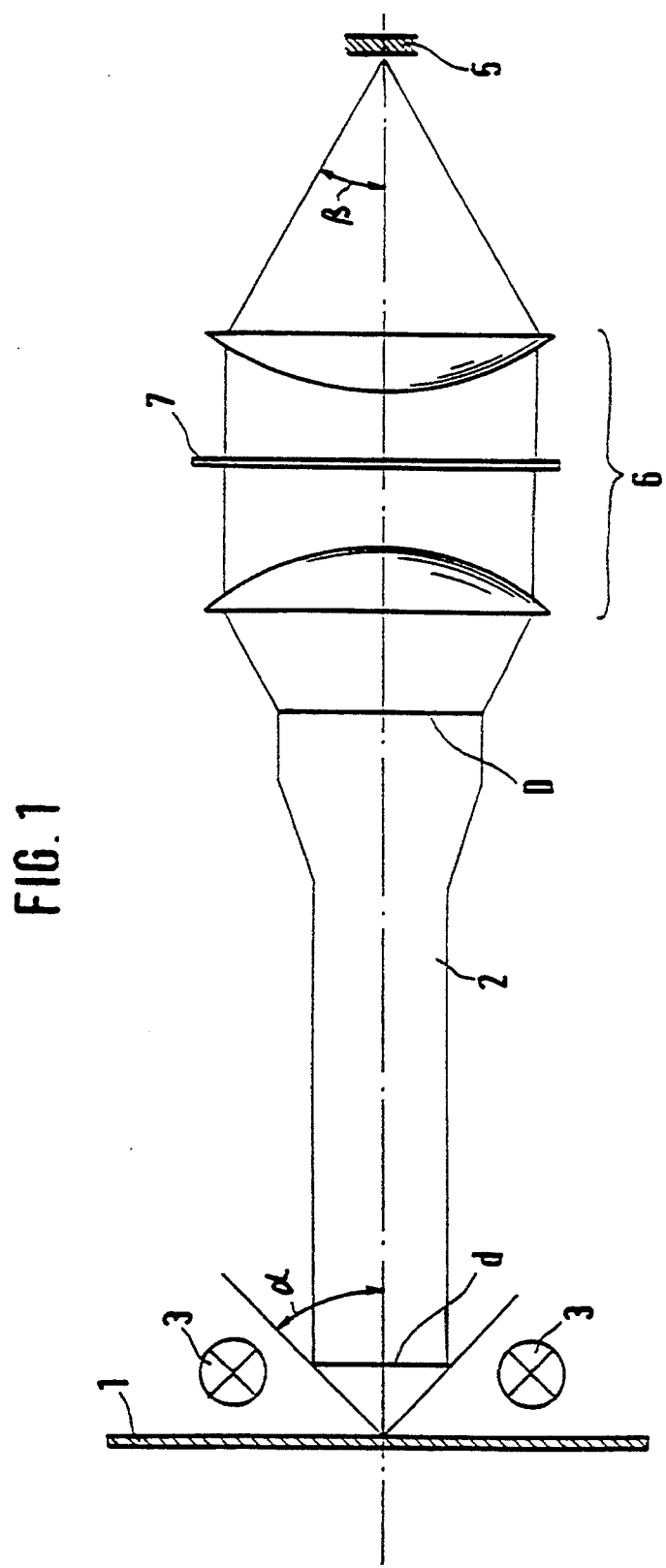
FIG. 1 shows the schematic structure of a measuring system using a flared light pipe.

FIG. 1 shows the schematic structure of an inventive optical sensor system and how it can be used for measuring bank notes with luminescent features. However this sensor system can also be used to check identity cards, labels or the like and quite generally wherever radiation is to be focused at a large solid angle and then processed further by an optical system. The same holds of course for the other inventive embodiments.

In the embodiment example shown, a bank note 1 provided for example with fluorescent color prints is illuminated by two light sources 3 emitting light of a corresponding excitation frequency. The diffuse fluorescent light emitted by bank note 1 is fed at an angle $\alpha$, the aperture angle, to an optical fiber pipe 2 and passed on by this pipe to opposite flared end D utilizing the total reflection.

The optical fiber pipe is thereby brought to the test object with the smaller cross-sectional end d up to a measuring distance between 0 and 10 mm. In accordance with the numerical aperture of optical fiber pipe 2 light beams can be coupled in at an angle $\alpha$ up to 80°. This angle $\alpha$ is reduced by the change in cross section in accordance with the equation $\sin\alpha=(D/d)\sin\beta$ to an angle $\beta$ of about 30° that can be processed further by a succeeding optical system 6 having for example an aperture ratio of 1.2:1.

In the shown case optical system 6 serves primarily to prepare the light from fiber pipe 2 for an interference filter 7 and then to focus it on a detector 5. This is because the radiation leaving the fiber pipe is very diffuse and contains not only the low-intensity narrow-band fluorescent radiation but also fractions of disturbing scattered light, for example from light sources 3 or the environment, so that the light must be filtered for an unfalsified signal evaluation. However interference filter 7 used for this purpose requires an almost parallel beam path, which is created by the optical system disposed before filter 7.

Figure 2:
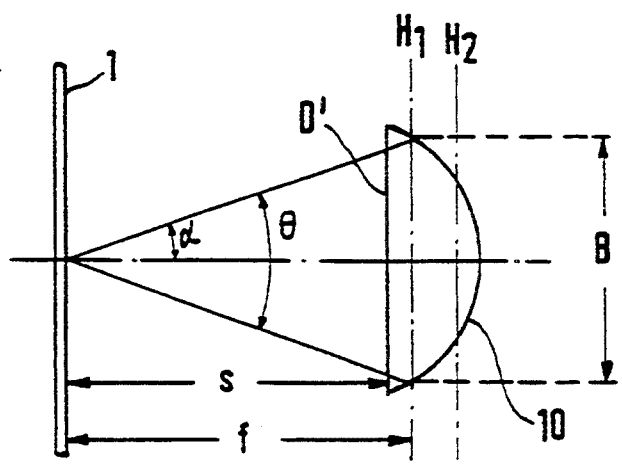
FIG. 2 shows the principle of the beam path in an optical lens system.

The inventive sensor system already has considerable advantages over conventionally used lens systems in the area of the test object, which shall be made clear again with reference to FIG. 2.

Due to the geometrical ratios in the test system, focal intercept s of the lens system, i.e. the distance between the test object in focus and the lens surface, cannot be shortened at will, in particular since thick lenses with a small focal intercept relative to their focal length are customarily used to obtain a compact structure. Therefore minimum focal length f is given, as is lens diameter D' at a desired aperture ratio between 1:1 and 2:1. For a lens of short focal length with f=13 mm and an aperture ratio D':f of 1.7:1 the resulting lens diameter is therefore D'=22 mm. Via the relation $\tan\alpha=D'/(2f)$ a maximum aperture angle $\alpha$ of about 40° thus results.

As also apparent from the drawing, the full spatial extent of lens 10 is not utilized when maximum solid angle $\Theta=2\alpha$ is detected since the variables described above, such as focal length f, relate to principal plane $H_1$ effective for the optical imaging. Instead lens 10 has a viewing window B that constitutes only a fraction of actual lens diameter D'. For the lens of short focal length with a diameter of 22 mm considered above the viewing window is only 5 mm.

If this lens system is replaced by a fiber pipe according to the invention the "viewing window" is automatically given by smaller cross-sectional area d. Apart from the smaller spatial extent the fiber pipe can be brought much closer to the test object so that the detectable solid angle is further increased, namely to $\alpha=70°$ at a measuring distance of 1 mm.

A further advantage of the inventive sensor system is that the change in cross section is selectable at will so that angle of emergence $\beta$ can be fundamentally adapted to any succeeding processing optical systems and their characteristic variables.

Figure 6:
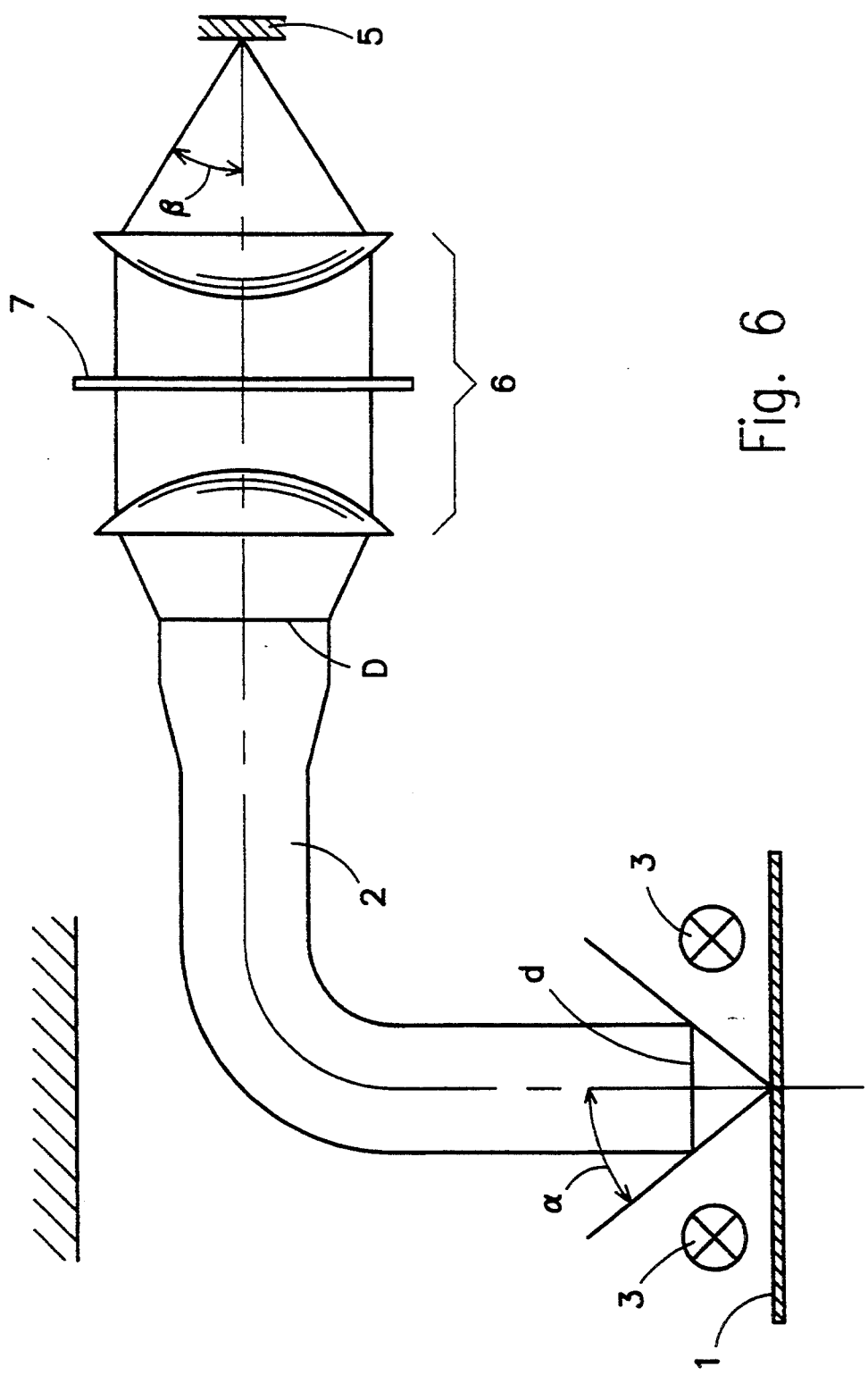
FIG. 6 shows another embodiment of the invention wherein the fiber pipe is curved.

It is also possible to provide the constructionally larger lens system, via possible curves of the optical fiber pipe, at a place in the measuring system housing where there is sufficient room. An optical sensor system with a curved fiber pipe is shown in FIG. 6.

This also makes it possible, for example, to scan the test object close to the object even in confined conditions with a plurality of measuring systems disposed one above or beside the other.

Figure 3:
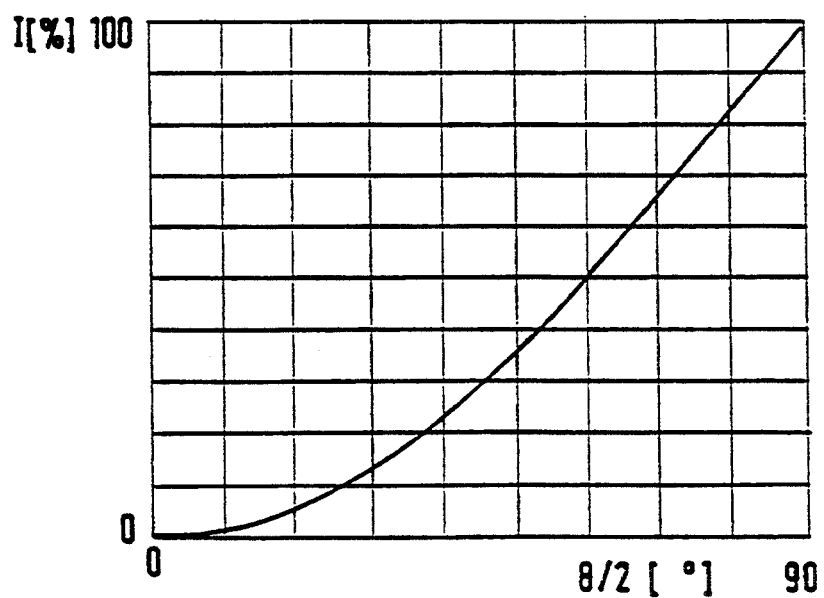
FIG. 3 shows the dependence of the signal intensity on the aperture angle with a spherical radiation pattern.

FIG. 3 shows the dependence of the signal intensity on aperture angle $\alpha$ based on the maximum aperture angle of 90°. For the lens system with an aperture angle of 40° discussed above a signal intensity of about 24% thus results based on the maximum value. For the inventive optical sensor system with an aperture angle of 70°, by contrast, the intensity increases to about 65%. Even considering the losses in the fiber pipe of about 30%, the system still has a signal intensity of 45%.

One thus obtains a signal improvement of about 100% with a much more compact structure.

Figure 4:
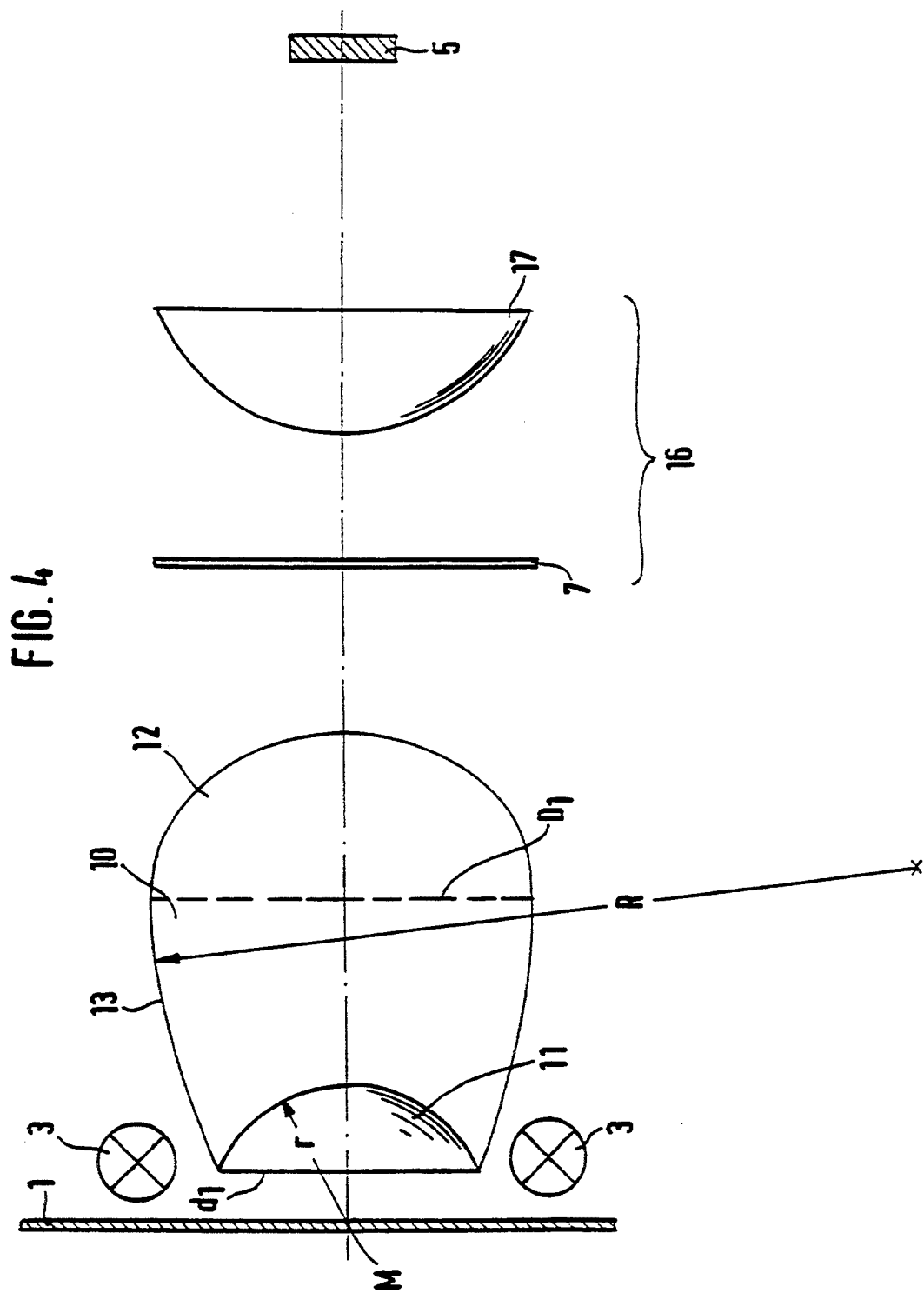
FIG. 4 shows the schematic structure of a further inventive embodiment.
Figure 5:
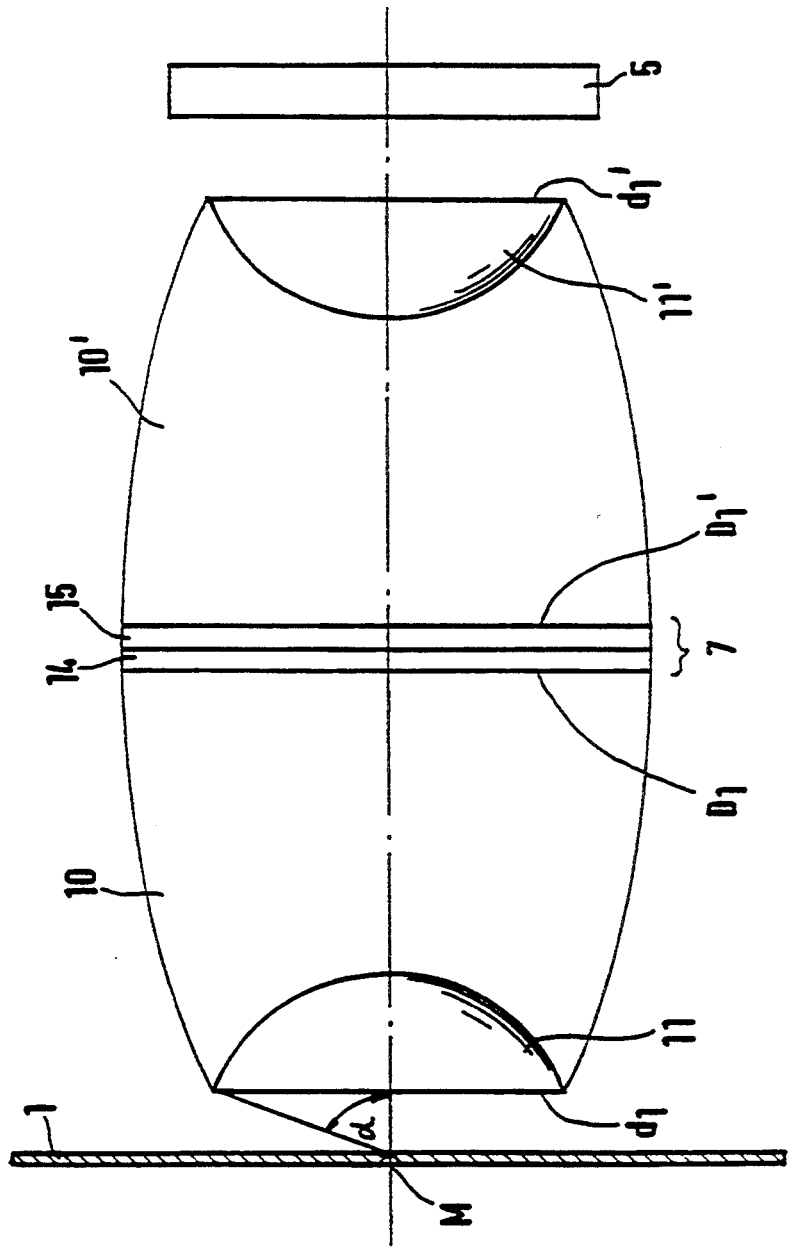
FIG. 5 shows an inventive measuring system with an interference filter without an interposed lens system.

The same advantages over optical lens systems are found in the embodiments of the invention shown in FIGS. 4 and 5. In these examples bank note i is also illuminated by two light sources 3 of a suitable excitation frequency. However the radiation emitted by bank note 1 is taken up and fed to a processing unit by a differently formed light guide.

The assembly shown in FIG. 4 comprises a light guide 10 whose entrance surface 11 is concave in shape while exit surface 12 is designed as a convex lens. Since all beams coming from the center of a sphere hit the surface of the sphere at right angles it is expedient to form the concave entrance surface as a segment of a sphere with radius r and to dispose bank note 1 in the central plane of the sphere. The light beams coming from center M of the sphere fall on the entrance surface at right angles and therefore pass into the inside of light guide 10 unimpaired, i.e. without reflection losses or refraction. They hit side surfaces 13 of light guide 10 and are totally reflected there. To obtain a flare of the light guide diameter, side surfaces 13 preferably have the form of sectors of a circle with radius R.

However radius r can also be selected to be much larger so that bank note 1 can no longer be disposed in the central plane. In this case optical system 10 acts like a concave-convex condenser lens for radiation that is incident at a small angle and therefore does not hit side surfaces 13. It also holds that the angle of emergence is smaller than the angle of incidence.

In a further variant side surfaces 13 can be sectors of an ellipse, one focus thereof being point M.

To ensure total reflection of the incident radiation the numerical aperture must not exceed the limiting angle for total reflection. Since there are already materials whose limiting angle for total reflection is in the range of 80° this condition does not restrict the use of the inventive measuring system.

The radiation crosses light guide 10 and falls on exit surface 12 designed as a convex lens. This surface ensures a largely parallel beam path so that light guide 10 can be followed by an interference filter 7. In this embodiment the first lens of optical system 6 shown in FIG. 1 is thus already integrated into the light guide.

Alternatively it would of course also be possible to provide the light guide with a plane-parallel exit surface of diameter D1, as indicated in FIG. 4 by the broken line, and to dispose the convex lens at a certain distance from light guide 10 as in FIG. 1.

Light guide 10 shown is rotationally symmetrical to the optical axis. For special applications, however, it is also conceivable to give light guide 10 any other desired form. The only essential point is that it has a large numerical aperture that is changed to a smaller angle of emergence.

In a further variant the effect of specular reflection can also be utilized instead of total reflection for the spread of light within system 10. For this purpose the optical material is not given a coating with a suitable refractive index but a specular coating covered on the outside by a layer of protective lacquer absorbent in the relevant wave range in order to avoid interference signals. This procedure is recommendable in particular for assemblies with an extremely large numerical aperture which exceeds the limiting angle of total reflection for the material used. However in this variant the loss rate is higher than when light guides are used.

If one selects the parameters such as numerical aperture and flare of the side surfaces suitably one can even obtain angles of emergence that make it possible to use interference filters without interposed lens systems.

FIG. 5 shows such an assembly. Here dielectric layers 14 and 15 acting as interference filter 7 are vacuum metalized directly on the plane-parallel end surface of light guide 10. To permit the filtered light to be fed to a detector 5 the same structure is provided again and disposed mirror-inverted to the first structure so that concave surface 11' of light guide 10' is directed onto detector 5.

Interference layers 14 and 15 need of course not be directly metalized on but can be disposed between optical systems 10 and 10' as a finished component.

It is also possible to design optical systems 10 and 10' differently. For example side surfaces 13 and 13' can have a different curvature.

This symmetrical structure without optics is also possible using the light pipe shown in FIG. 1. In this case smaller cross-sectional area d points toward detector 5.

I claim:

1. An apparatus for optically testing objects such as security documents or labels with an optical system that detects radiation from a test object at an angle of incidence, emits the radiation at an angle of emergence, and feeds the radiation to a processing unit with a known aperture angle, said optical system comprising an optical wave guide (2, 10) with a narrow cross-sectional end (d, d1) and a flared cross-sectional end (D, D1) having a change in cross section in the longitudinal direction of the wave guide (2, 10), the narrow cross-sectional end (d, d1) being directed onto the test object while the flared cross-sectional end (D, D1) faces the processing unit (6, 7, 17) and the angle of emergence of the wave guide (2, 10) is smaller than the aperture angle of the processing unit (6, 7, 17).

2. The apparatus of claim 1, wherein the optical wave guide is an optical fiber pipe (2).

3. The apparatus of claim 2, wherein the optical fiber pipe (2) has at least one curve, to provide the processing unit at a place in the apparatus where is sufficient room.

4. The apparatus of claim 1, wherein the narrow cross-sectional end (d) comprises a concave entrance surface (11).

5. The apparatus of claim 4, wherein the concave entrance surface (11) has the form of a spherical segment.

6. The apparatus of claim 1, wherein the optical wave guide (10) is made of optical material having a coating of optically thin material.

7. The apparatus of claim 1, wherein the optical wave guide (10) is made of an optical material, and the side surfaces (13) of the optical wave guide (10) bear a specular coating.

8. The apparatus of claim 7, wherein the side surfaces (13) additionally bear a protective lacquer coat absorbent in the relevant wave range.

9. The apparatus of claim 1, wherein the exit surface of the optical wave guide (10) is plane-parallel.

10. The apparatus of claim 1, wherein the processing unit is an optically imaging lens system (6).

11. The apparatus of claim 10, wherein thick lenses with a small focal intercept relative to their focal length are used for the lens system (6).

12. The apparatus of claim 1, wherein the processing unit is an interference filter (7) directly following the exit surface (D, D1).

13. The apparatus of claim 12, wherein a further optical system (10') is disposed mirror-inverted to the interference filter (7).

14. The apparatus of claim 1, wherein the exit surface of the optical wave guide (10) has the form of a convex lens (12).

15. The apparatus of claim 14, wherein the processing unit (16) comprises an interference filter (7) and an optically imaging lens (17).

16. The apparatus of claim 1, wherein the wave guide is curved, whereby curvature allows room to be made for additional optical systems to be disposed in a housing so as to make possible scanning of the test object close to the object even in confined conditions.

17. The apparatus of claim 1, wherein the optical wave guide is conic in shape.

18. The apparatus of claim 1, wherein the side surfaces (13) of the optical wave guide (10) have the form of sectors of a circle.

* * * * *